(12) United States Patent
Shaharabany et al.

(10) Patent No.: US 10,802,734 B2
(45) Date of Patent: Oct. 13, 2020

(54) METHOD FOR FAST BOOT READ

(71) Applicant: Western Digital Technologies, Inc., San Jose, CA (US)

(72) Inventors: Amir Shaharabany, Kochav Yair (IL); Ivo Faldini, Petah Tikva (IL); Arseniy Aharonov, Rehovot (IL); Miki Sapir, Nes Ziona (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/147,161

(22) Filed: Sep. 28, 2018

(65) Prior Publication Data

US 2020/0104067 A1    Apr. 2, 2020

(51) Int. Cl.
*G06F 9/44* (2018.01)
*G06F 3/06* (2006.01)
*G06F 12/02* (2006.01)
*G06F 9/4401* (2018.01)

(52) U.S. Cl.
CPC .......... *G06F 3/0632* (2013.01); *G06F 3/0607* (2013.01); *G06F 3/0644* (2013.01); *G06F 3/0679* (2013.01); *G06F 9/4411* (2013.01); *G06F 12/0246* (2013.01)

(58) Field of Classification Search
CPC .. G06F 12/0246; G06F 3/0679; G06F 3/0632; G06F 3/0644; G06F 3/0607; G06F 9/4411; G06F 9/4416; G06F 12/02; G06F 3/06; G06F 9/4401
USPC .......................... 711/112, 113, 206, 170, 154
See application file for complete search history.

(56) References Cited

U.S. PATENT DOCUMENTS

| | | | |
|---|---|---|---|
| 8,706,955 B2 * | 4/2014 | Fai | G06F 9/4416 711/103 |
| 9,286,079 B1 * | 3/2016 | Roden | G06F 9/4401 |
| 10,394,570 B2 * | 8/2019 | Baik | G06F 9/4406 |
| 2010/0169558 A1 * | 7/2010 | Honda | G06F 9/4403 711/103 |
| 2014/0115315 A1 * | 4/2014 | Ratn | G06F 9/4401 713/2 |

(Continued)

OTHER PUBLICATIONS

Sangam Racherla, Delmar Demarchi, Scott Dybas, Bobby Stark, Mansoor Syed, "SAN Boot Implementation and Best Practices Guide for IBM System Storage", IBM Redbooks, Sep. 2012.*

*Primary Examiner* — Pierre Miche Bataille
(74) *Attorney, Agent, or Firm* — Loza & Loza, LLP; Gabriel F. Fitch

(57) ABSTRACT

The disclosure relates to optimizing a mount process at a data storage device. The storage device communicates with a host using a mount process and mounts a master table, the master table caching translation table pointers associated with a boot partition. The storage device then sends a ready signal to the host indicating that the storage device is ready to receive a boot partition read command from the host. The storage device suspends the mount process for a window of time to receive the boot partition read command and executes the boot partition read command if the boot partition read command is received during the window of time. Accordingly, by caching boot partition pointers in the master table, the mount time of the boot partition is shortened to allow the storage device to send the ready signal earlier and provide the host with earlier access to the boot partition.

10 Claims, 7 Drawing Sheets

(56) References Cited

U.S. PATENT DOCUMENTS

2018/0173536 A1\* 6/2018 Sela ................ G06F 9/441
2020/0097188 A1\* 3/2020 Gunda ............... G06F 9/4401

\* cited by examiner

METHOD FOR FAST BOOT READ

FIELD

The disclosure relates, in some embodiments, to data storage devices (e.g., solid state devices (SSDs) or solid state drives) including non-volatile memory (NVM) devices and memory controllers for use therewith. More specifically, but not exclusively, the disclosure relates to optimizing a mount process at a data storage device to provide a host device with earlier access (e.g., read access) to a boot partition.

INTRODUCTION

Solid state devices (SSDs) incorporating non-volatile memories (NVMs), such as flash NAND memories, are replacing or supplementing conventional rotating hard disk drives for mass storage in many consumer or industrial electronics and computers. In a typical SSD-based product, a host computing device includes or communicates with an NVM device controller that in turn controls access to one or more NVM devices.

In automotive technologies, subsystems of a host device may depend on data stored in a data storage device. Such host device subsystems may be mounted in a serial manner with respect to the mounting of a storage device since the host device subsystems rely on the stored data. Accordingly, a storage device mount time may greatly affect the performance of the host device subsystems.

In a previous approach, a storage device mount process is an internal operation where the storage device mounts an entire storage device system. A previous storage device mount design aimed to reduce a mount time as much as possible in order for the storage device to start receiving read and write commands from the host device. When the mount process is complete, the storage device may receive host device commands for all supported partitions. Notably, a previous host device write process may be designed for maximum write and read performance and not for expediting a mount time.

The storage device may support a number of partitions including a host boot partition. Currently, a host boot partition mount time is equivalent to the mount times of other partitions since all partitions are subject to the same system mount process. The mount process is complete when the storage device is ready to receive commands for an entire storage range. Even in systems where the host boot partition is mounted earlier than other partitions, a service level of the read commands related to the host boot partition is low (e.g., poor read latency) because such read commands are serviced simultaneously with commands from other partitions during, or at the completion of, the mount process. In view of the above, a current storage device mount process may be too slow for some automotive applications (e.g., backup camera application) where early access to the host boot partition is desired. Therefore, it would be advantageous to reduce the mount time of the host boot partition or any other specific partition to improve the processing latency of commands related to such partition.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device for managing a mount process that includes a non-volatile memory (NVM) array and a processor coupled to the NVM array. In one example, the processor is configured to: initiate communication with a host device using a mount process; mount a read only memory (ROM) system; mount a master table; send a signal to the host device after the master table is mounted, the signal indicating that the data storage device is ready to receive, from the host device, a boot partition read command related to a boot partition supported by the data storage device; suspend the mount process for a window of time to receive the boot partition read command from the host device including receiving a command during the window of time and determining whether the command is the boot partition read command; execute the boot partition read command if the boot partition read command is received during the window of time; refrain from executing the command if the command is not the boot partition read command; if the boot partition read command is not received during the window of time, mount a translation table, mount the boot partition, mount a main partition, and send a second signal to the host device, the second signal indicating that the data storage device is ready to receive, from the host device, commands related to all partitions supported by the data storage device; and write the master table to the NVM array.

One embodiment of the disclosure provides a method of managing a mount process at data storage device. In one example, the method includes: initiating communication with a host device using a mount process; mounting a read only memory (ROM) system; mounting a master table; sending a signal to the host device after the master table is mounted, the signal indicating that the data storage device is ready to receive, from the host device, a boot partition read command related to a boot partition supported by the data storage device; suspending the mount process for a window of time to receive the boot partition read command from the host device including receiving a command during the window of time and determining whether the command is the boot partition read command; executing the boot partition read command if the boot partition read command is received during the window of time; refraining from executing the command if the command is not the boot partition read command; if the boot partition read command is not received during the window of time, mounting a translation table, mounting the boot partition, mounting a main partition, and sending a second signal to the host device, the second signal indicating that the data storage device is ready to receive, from the host device, commands related to all partitions supported by the data storage device; and writing the master table to a non-volatile memory (NVM) array of the data storage device.

One embodiment of the disclosure provides a system for managing a write process that includes a host device, a data storage device including a non-volatile memory (NVM) array, and a host interface facilitating communication between the host device and the data storage device. In one example, the host device is configured to: write host device data from the host device to the NVM array; update a translation table to map logical block addresses (LBAs) of the host device data to physical locations of the host device data in the NVM array; update translation table pointers based on the updated translation table; write the updated translation table to the NVM array; determine whether the updated translation table pointers correspond to LBAs associated with a boot partition; update boot partition pointers in a master table based on the updated translation table pointers if the updated translation table pointers correspond to the LBAs associated with the boot partition; and write the master table to the NVM array.

One embodiment of the disclosure provides a system for managing a write process that includes: means for initiating communication between a host device and a data storage device, the data storage device including a non-volatile memory (NVM) array; means for writing host device data from the host device to the NVM array; means for updating a translation table to map logical block addresses (LBAs) of the host device data to physical locations of the host device data in the NVM array; means for updating translation table pointers based on the updated translation table; means for writing the updated translation table to the NVM array; means for determining whether the updated translation table pointers correspond to LBAs associated with a boot partition; means for updating boot partition pointers in a master table based on the updated translation table pointers if the updated translation table pointers correspond to the LBAs associated with the boot partition; and means for writing the master table to the NVM array.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
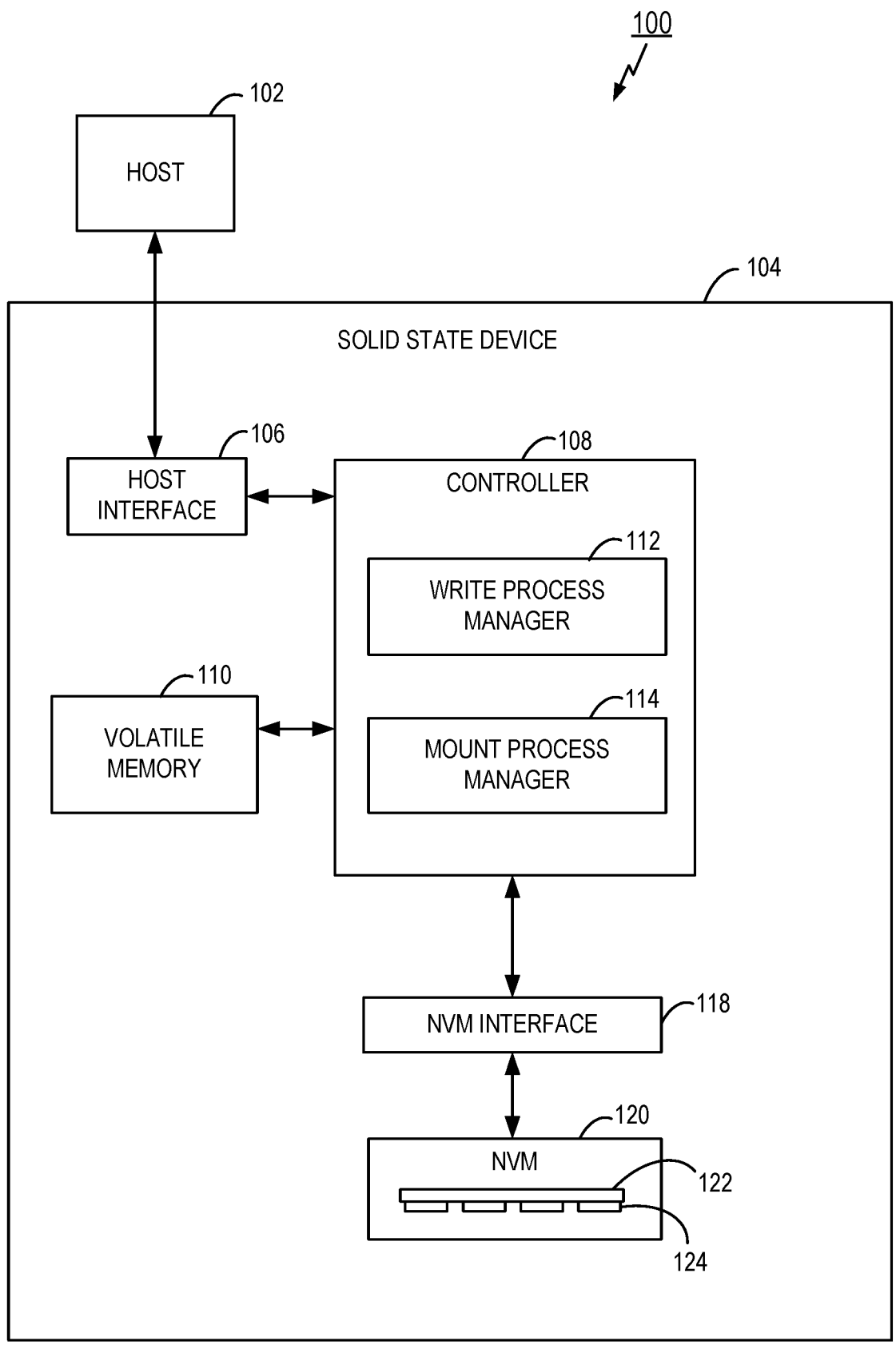
FIG. 1 is a block diagram of an exemplary solid state device (SSD) at which a mount process/write process may be managed in accordance with aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The present disclosure provides methods, apparatus, and systems for optimizing a mount process at a data storage device. The mount process may include a number of stages including a master table mount and a partition mount. The master table mount is a process that mounts a main backend data structure containing a flash management table's root and current open blocks for write operations. The partition mount may include a translation table (L2P table) mount and a boot partition mount. The translation table (L2P table) mount is a process that mounts a translation table, which is a table mapping a logical address to a physical location (L2P table) in a storage array. The boot partition mount is a process that allows the data storage device to start receiving commands for a boot partition.

During a normal mount process, the master table is mounted before the translation table (L2P table), and the translation table is mounted before the boot partition. Moreover, boot partition pointers (that may be used by a host to access its boot partition data) are stored in the translation table. Accordingly, the speed at which a host may access the boot partition may depend on an amount of time needed to mount the translation table. However, because the amount of time needed to mount the translation table is typically substantial, the normal mount process may be too slow for some applications (e.g., automotive backup camera application) where early access to the boot partition is desired. In part, the substantial mount time for the translation table is due to its relatively large size. Aspects of the present disclosure relate to storing/caching the boot partition pointers in the master table rather than the translation table. By storing/caching the boot partition pointers in the master table (which is smaller than the translation table), the boot partition pointers can be mounted (with the master table) earlier during the mount process (i.e., mounted prior to the translation table). Therefore, the host can access (e.g., execute read commands related to) the boot partition faster than the normal mount process (using the boot partition pointers stored in the master table) since the host does not have to wait for the translation table to mount before accessing the boot partition, thereby decreasing a host mounting time.

In one aspect, a controller of a storage device initiates communication with a host using a mount process and mounts a master table. The master table caches translation table pointers associated with a boot partition (boot partition pointers). The controller sends a ready signal to the host indicating that the storage device is ready to receive a boot partition read command from the host related to the boot partition. The controller suspends the mount process for a window of time to receive the boot partition read command and executes the boot partition read command if the boot partition read command is received during the window of time. Accordingly, by caching boot partition pointers in the master table, the mount time of the boot partition is shortened to allow the controller to send the ready signal earlier and provide the host with earlier access to the boot partition.

In another aspect, a host device initiates communication with a data storage device and writes host device data from the host device to a non-volatile memory (NVM) array of the data storage device. The host device then updates a translation table to map logical block addresses (LBAs) of the host device data to physical locations of the host device data in the NVM array and updates translation table pointers based on the updated translation table. The host device may write the updated translation table to the NVM array. The host device may further determine whether the updated translation table pointers correspond to LBAs associated with a boot partition. The host device then updates boot partition pointers in a master table based on the updated translation table pointers if the updated translation table pointers correspond to the LBAs associated with the boot partition, and may write the master table to the NVM array.

Referring to the drawings, FIG. 1 is a block diagram of a system 100 including an exemplary solid state device (SSD) in which the disclosed managing of a write process/device mount process may be implemented in accordance with aspects of the disclosure. In one aspect, the SSD may be a solid state drive. The system 100 includes a host 102 and a SSD 104 coupled to the host 102. The host 102 provides commands to the SSD 104 for transferring data between the host 102 and the SSD 104. For example, the host 102 may provide a write command to the SSD 104 for writing data to the SSD 104 or a read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, a controller 108, a volatile memory 110, a non-volatile memory interface (NVM interface) 118, and a non-volatile memory (NVM) 120, such as a NAND flash memory, for example. In one aspect, the NVM interface 118 may be an interface to flash memory. The host interface 106 is coupled to the controller 108 and facilitates communication between the host 102 and the controller 108. Additionally, the controller 108 is coupled to the volatile memory 110 and coupled to the NVM 120 via the NVM interface 118. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote with respect to the host 102 or is contained in a remote computing system communicatively coupled with the host 102. For example, the host 102 may communicate with the SSD 104 through a wireless communication link.

The controller 108 controls operation of the SSD 104. In various aspects, the controller 108 receives commands from the host 102 through the host interface 106 and performs the commands to transfer data between the host 102 and the NVM 120. Furthermore, the controller 108 may manage reading from and writing to the volatile memory 110 for performing the various functions effected by the controller and to maintain and manage cached information stored in the volatile memory 110. The controller may include a write process device (or circuit/module) 112 that manages the storage of data/write processes in the NVM 120. The controller 108 may also include a mount process manager device (or circuit/module) 114 that manages mount processes between the host 102 and the SSD 104.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The volatile memory 110 may be any memory, computing device, or system capable of storing data. For example, the volatile memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the volatile memory 110, or a portion thereof, to store data during the transfer of data between the host 102 and the NVM 120. For example, the volatile memory 110 or a portion of the volatile memory 110 may be a cache memory.

The NVM 120 receives data from the controller 108 via the NVM interface 118 and stores the data. The NVM 120 may be any type of non-volatile memory, such as a flash storage system, a NAND-type flash memory, a solid state data storage device, a flash memory card, a secure digital (SD) card, a universal serial bus (USB) memory device, a CompactFlash card, a SmartMedia device, a flash storage array, or the like. The NVM 120 may include one or more memory modules 122, wherein one or more memory dies 124 are formed as part of a memory module 122.

The controller 108 (including the write process manager 112 and the mount process manager 114), the NVM interface 118, and/or the NVM 120 can be configured to perform any of the processes described herein for managing a write process and/or a mount process in a SSD.

Aspects of the present disclosure relate to optimizing a mount time of a specific partition (e.g., host boot partition)

during a data storage device (e.g., SSD) mount process to improve a read latency from the specific partition while performing other operations of the mount process. In an aspect, the present disclosure facilitates access to the specific partition (e.g., host boot partition) before the completion of the entire mount process.

In an aspect, the data storage device mount process is a serial process having a number of stages where each stage is initiated based on the completion of a previous stage. The mount process is an essential process in the data storage device that enables the data storage device to restart from a power-off state or a power failure situation. The mount process may have the following stages in order: 1) ROM system mount; 2) Master table mount; 3) Partition mount; and 4) Send "ready for host read and write" signal to the host device.

The read only memory (ROM) system mount is a basic infrastructure mount that enables the data storage device to operate memory devices, host interfaces, hardware units, etc. The master table mount is a process that mounts a main backend data structure that contains a flash management table's root and current open blocks for write operations.

The partition mount includes a translation table mount, a boot partition mount, and a main partition mount. The translation table mount is a process that mounts a translation table, which is a table mapping a logical address to a physical location (L2P table) in a storage array. The boot partition mount is a process that allows the data storage device to start receiving commands for a boot partition. This may include scanning open blocks related to the boot partition. The main partition mount is a process that allows the data storage device to start receiving commands for all other partitions. This may include scanning open blocks related to all of the other partitions.

Each one of the stages of the mount process may take a certain amount of time to complete. Accordingly, a mount time of the entire mount process is the sum of the times needed to complete the stages. When the entire mount process is complete, the data storage device may send a "ready for host read and write" signal to the host device.

In an aspect, the present disclosure relates to a system, apparatus, and method for shortening the mount time of the boot partition and enabling the data storage device to send the "ready for host read and write" signal earlier to provide the host device with earlier access to the boot partition. A major portion of the mount time of the entire mount process may be attributed to the mount of the translation table (L2P table). Accordingly, the present disclosure provides for caching boot partition pointers from the translation table into the master table to avoid having to wait for an entire translation table to mount before the boot partition can be mounted.

The size of the translation table may have a linear relationship to the storage capacity of the data storage device. For example, the translation table size may be approximately ¹⁄₁₀₀₀ of the storage capacity size. The size of the boot partition may be a small portion of an exported capacity. For example, if the size of the exported capacity is 100 MB (100,000 KB) and the size of the translation table is 32 KB, then the boot partition may be pointed by approximately 4 pointers (e.g., (100,000 KB)*(¹⁄₁₀₀₀)/(32 KB)=3.125≈4 pointers). In an aspect, the 4 boot partition pointers may be directly cached in the master table (MST). Consequently, the boot partition can be "ready for host read and write" immediately after the master table boot stage is complete without waiting for the completion of the translation table mount and/or the mount of other partitions.

In an aspect, when the host device writes to logical block addresses (LBAs) of the boot partition, flash management (FM) may need to update portions of the translation table associated with the boot partition LBAs. If a location of such portions change in the translation table, the FM may update a pointer of a boot table portion in the master table.

In an aspect, when the master table is written during a power-off state (graceful shutdown), the cached pointers to the portions of the translation table associated with the boot partition LBAs are available after the master table mount and the data storage device is "ready for host read and write" for boot partition LBAs. When power failure occurs (ungraceful shutdown), the master table is not written and the cached pointers may not be updated. Accordingly, the host device may fail to read boot data. However, the host device may maintain two boot partitions for such scenarios and the host device may mount from a different boot partition.

In an aspect, the master table may be written to the flash storage memory whenever writing the boot partition. This may increase a write amplification (WA) but reduce performance of the boot partition. However, in some aspects, increasing the WA while reducing the boot partition performance may be acceptable. This enables support of ungraceful shutdown without using another boot partition as backup.

In an aspect, when the mount of the master table is complete and the signal indicating that the data storage device is "ready for host read and write" for boot partition is sent, the data storage device may wait for a predefined window of time before continuing the mount process. During the window of time, the host device may send a read request for the boot partition, and the data storage device may reply with full bandwidth, end to end between the storage memory arrays, to the host device. Notably, if the rest of the mount process is continued without the data storage device waiting during the window of time, the bandwidth will be deteriorated since the mount process will be handled in parallel with the on-going host read operations, which will consume central processing unit (CPU) time and keep storage memory arrays busy.

In an aspect, alternative to the window of time being predefined, the window of time may be calculated according to a boot partition size: Window of time=(boot partition size/read performance)+latency estimation time. For example, if the boot partition size is 4 MB, the device read performance is 400 MB/s, and the latency estimation time is 5 ms, then the window of time is (4 MB/400 MB/s)+6 ms=10 ms+6 ms=16 ms.

Figure 2:
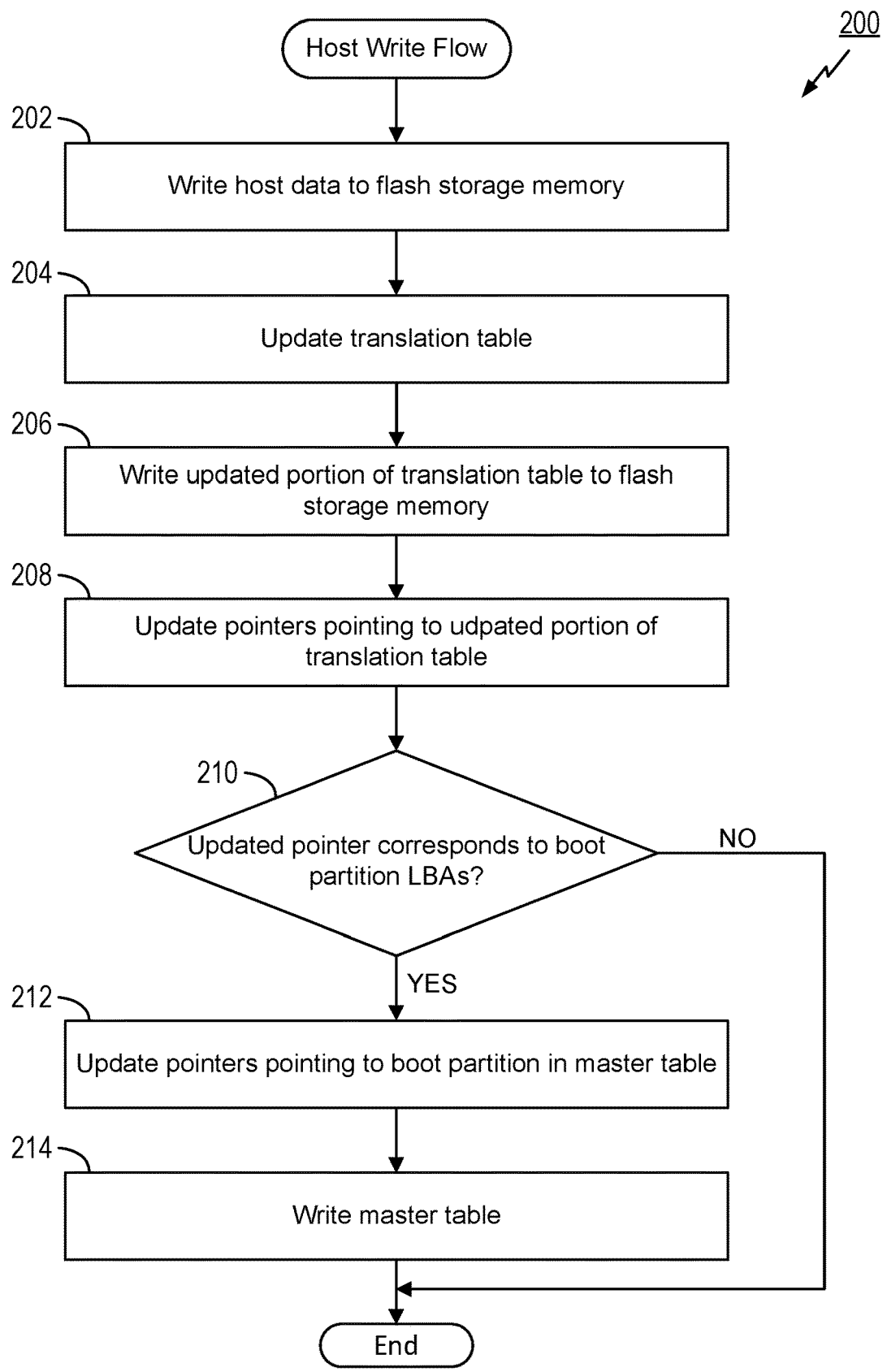
FIG. 2 illustrates a flow diagram of an exemplary method for a host write flow in accordance with aspects of the disclosure.

FIG. 2 illustrates a flow diagram 200 of an exemplary method for a host write flow in accordance with aspects of the disclosure. The method 200 may be performed by a host device (e.g., host 102) in conjunction with a controller (e.g., controller 108) of the data storage device (e.g., SSD 104).

The method 200 includes writing host data to a flash storage memory (e.g., NVM 120) as shown at block 202. The method 200 further includes updating a translation table as shown at block 204. In an aspect, updating the translation table includes writing a translation table to map logical block addresses (LBAs) of the host data to physical locations of the host data in the flash storage memory. The method also includes writing an updated portion of the translation table to the flash storage memory as shown at block 206.

The method 200 further includes updating pointers pointing to the updated portion of the translation table as shown at block 208. The method 200 includes determining whether an updated pointer corresponds to boot partition LBAs as shown at block 210. If so, the method 200 also includes updating pointers pointing to a boot partition in the master table as shown at block 212 and optionally writing the master table in the flash storage memory as shown at block 214.

Figure 3:
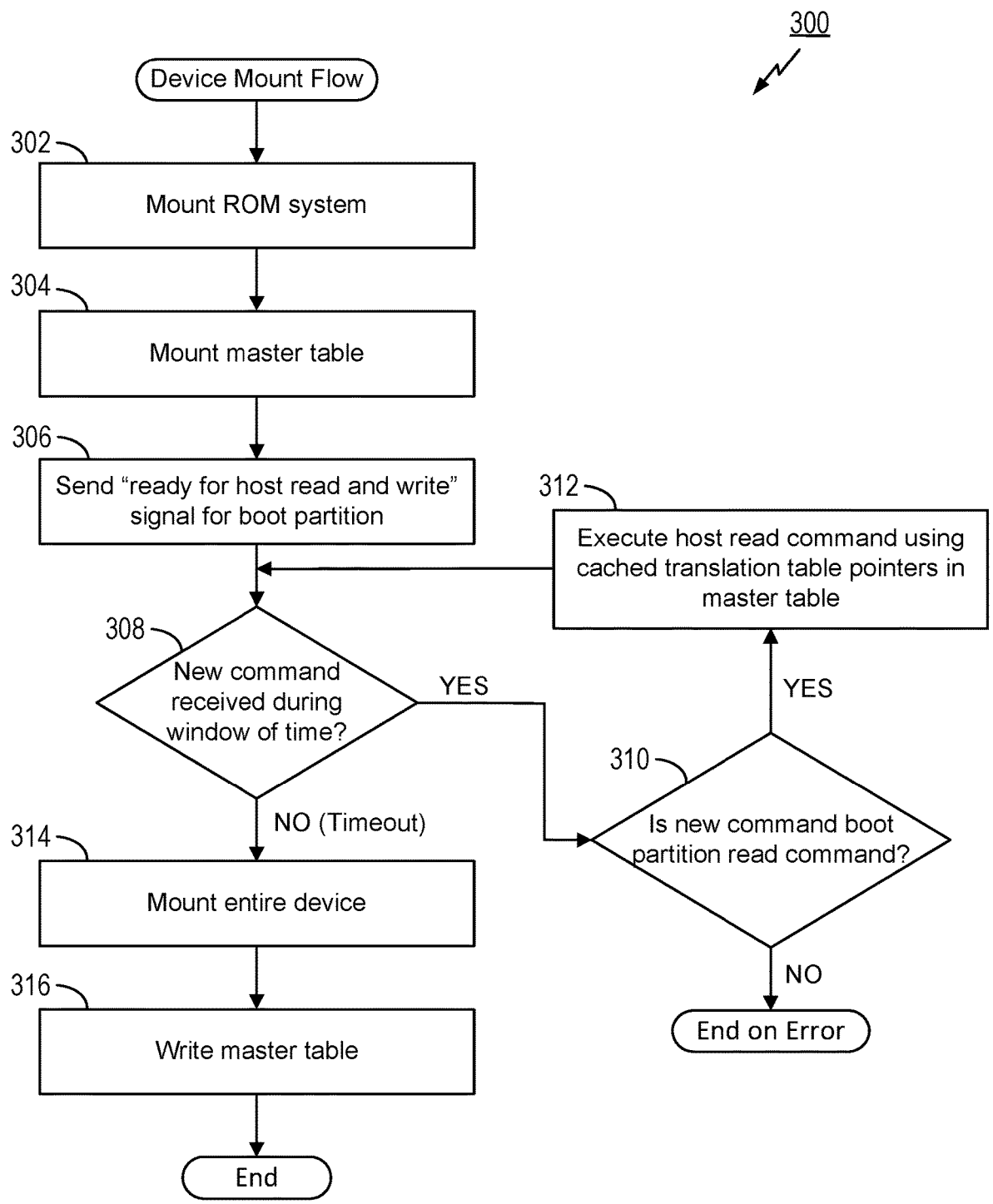
FIG. 3 illustrates a flow diagram of an exemplary method for a device mount flow at a data storage device in accordance with aspects of the disclosure.

FIG. 3 illustrates a flow diagram 300 of an exemplary method for a device mount flow at a data storage device, such as a solid state device (SSD), in accordance with aspects of the disclosure. In one aspect, the SSD may be a solid state drive. The method 300 may be performed by a controller (e.g., controller 108) of the data storage device (e.g., SSD 104).

The method 300 includes mounting a read only memory (ROM) system as shown at block 302. The ROM system mount is a basic infrastructure mount that enables the data storage device to operate various components of the data storage device, such as memory, host interfaces, hardware units, etc.

The method 300 also includes mounting a master table as shown at block 304. The master table mount includes mounting a main backend data structure that contains a flash management table's root and current open blocks for write operations.

The method 300 further includes sending a "ready for host read and write" signal for partition to a host device as shown at block 308. By sending the "ready for host read and write" signal to the host device after the master table mount, the data storage device allows the host device to access the boot partition without having to wait for the completion of a translation table mount and/or a mount of other partitions.

The method 300 includes suspending the mount flow for a window of time after the "ready for host read and write signal" is sent and determining whether a new command is received from the host device during the window of time as shown at block 308. If the new command is received during the window of time, the method 300 includes determining whether the new command is a boot partition read command as shown at block 310. If the new command is not the boot partition read command, the method 300 ends due to an error. However, if the new command is the boot partition read command, the method 300 includes executing the host device read command using cached translation table pointers in the master table related to the boot partition (boot partition pointers) as shown at block 312. The method 300 then reverts back to block 308.

Alternatively, if the new command is not received during the window of time, the method 300 includes mounting the rest of the entire data storage device as shown at block 314. For example, this may include a translation table mount, a boot partition mount, and a main partition mount. The translation table mount mounts a mapping table that maps a logical address to a physical location in a flash memory storage array. The boot partition mount is a process that allows the data storage device to start receiving commands for the boot partition. This may include scanning boot partition open blocks for future write operations of the boot partition. The main partition mount is a process that allows the data storage device to start receiving commands for all other partitions. This may include scanning open blocks related to all of the other partitions. After the entire storage device is mounted, the method 300 may include sending a "ready for host read and write" signal for all partitions to the host device. The method 300 may optionally include writing the master table to the flash storage memory as shown at block 316.

Advantages of the present disclosure relate to optimizing a mount process at a data storage device to provide a host with earlier access (e.g., read access) to a boot partition. By shortening the mount time of the boot partition and providing the data storage device with an exclusive boot read command time window for receiving a boot read command from the host, the host mount time for critical host modules and applications can be shortened. For example, according to an optimized mount process of the present disclosure, a car backup camera may be mounted in a shorter amount of time as compared to previous mount processes.

Figure 4:
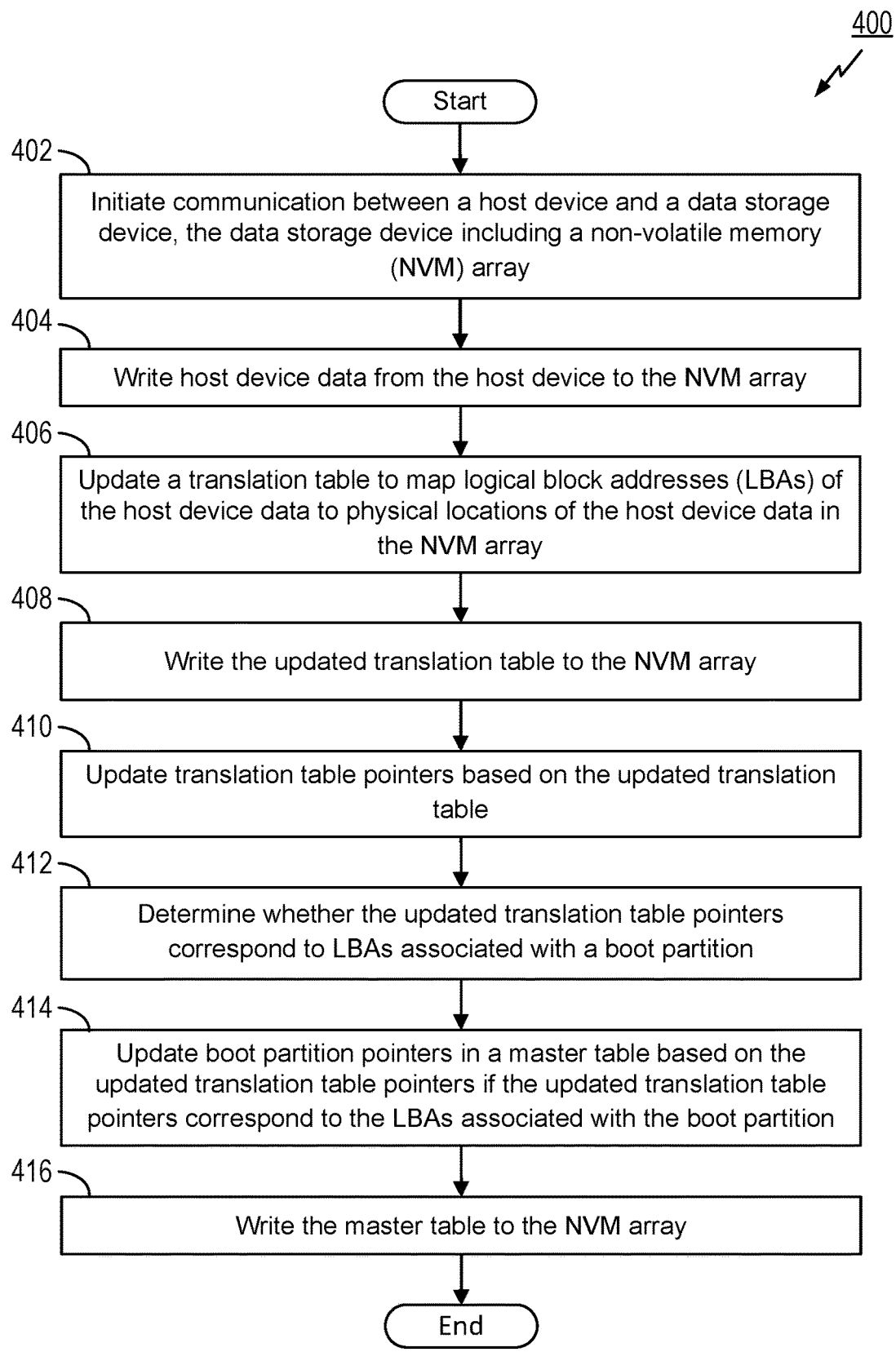
FIG. 4 illustrates a flow diagram of an exemplary method for managing a write process in accordance with aspects of the disclosure.

FIG. 4 illustrates a flow diagram of an exemplary method 400 for managing a write process. The method 400 may be performed by a host device (e.g., host 102) and a data storage device (e.g., SSD 104) having at least a controller (e.g., controller 108), a non-volatile memory (e.g., NVM 120) array, and a host interface (e.g., host interface 106).

The method 400 includes initiating communication between the host device and the data storage device as shown at block 402. The method 400 also includes writing host device data from the host device to the NVM array as shown at block 404.

The method 400 further includes updating a translation table to map logical block addresses (LBAs) of the host device data to physical locations of the host device data in the NVM array as shown at block 406. The method 400 may also include writing the updated translation table to the NVM array as shown at block 408.

The method 400 includes updating translation table pointers based on the updated translation table as shown at block 410 and determining whether the updated translation table pointers correspond to LBAs associated with a boot partition as shown at block 412. The method 400 further includes updating boot partition pointers in a master table based on the updated translation table pointers if the updated translation table pointers correspond to the LBAs associated with the boot partition as shown at block 414. In an aspect, the updated boot partition pointers in the master table are used by the data storage device to execute a command from the host device associated with the boot partition. The method 400 may also include writing the master table to the NVM array as shown at block 416.

Figure 5:
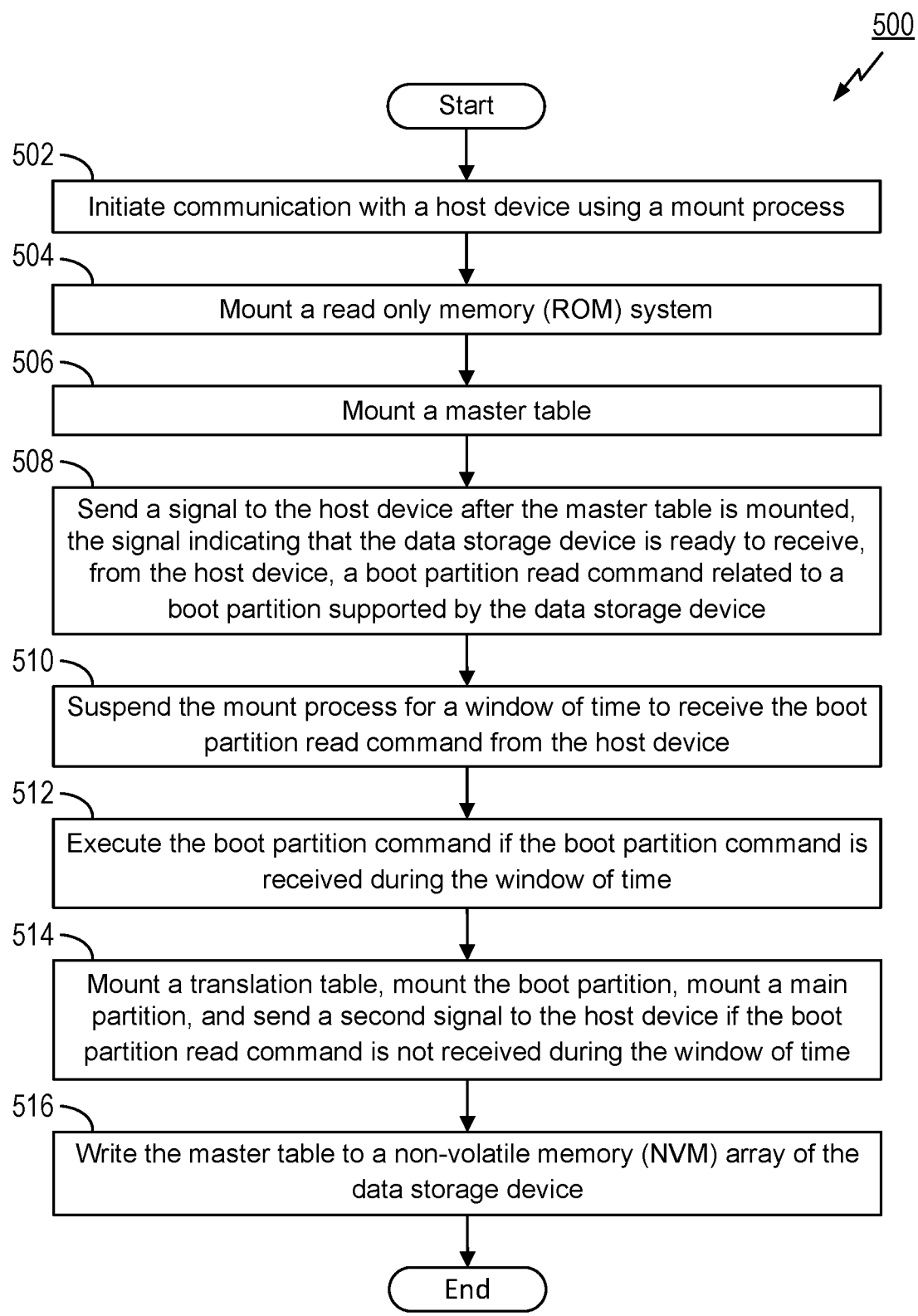
FIG. 5 illustrates a flow diagram of an exemplary method for managing a mount process in a data storage device in accordance with aspects of the disclosure.

FIG. 5 illustrates a flow diagram of an exemplary method 500 for managing a mount process in a data storage device (e.g., SSD 104). The data storage device may be a solid state device or a solid state drive. The method 500 may be performed by a controller (e.g., controller 108).

The method 500 includes initiating communication with a host device (e.g. host 102) using a mount process as shown at block 502. The method 500 further includes mounting a read only memory (ROM) system as shown at block 504.

The method 500 includes mounting a master table as shown at block 506. Thereafter, the method 500 includes sending a signal to the host device after the master table is mounted as shown at block 508. The signal indicates that the data storage device is ready to receive, from the host device, a boot partition read command related to a boot partition supported by the data storage device. In an aspect, the master table caches translation table pointers associated with the boot partition (i.e., boot partition pointers).

The method 500 includes suspending the mount process for a window of time to receive the boot partition read command from the host device as shown at block 510. In an aspect, the suspending the mount process may include receiving a command during the window of time and determining whether the command is the boot partition read command. In a further aspect, the method 500 includes refraining from executing the command if the command is not the boot partition read command.

The method 500 includes executing the boot partition read command if the boot partition read command is received during the window of time as shown at block 512. In an aspect, the boot partition read command is executed using the translation table pointers associated with the boot partition (boot partition pointers) that are cached in the master table.

If the boot partition read command is not received during the window of time, the method 500 further includes performing a number of various operations related to the mount process as shown at block 514. For example, the method 500 may include mounting a translation table, mounting the boot partition, and mounting a main partition. The method 500 may further include sending a second signal to the host device. The second signal indicates that the data storage device is ready to receive, from the host device, commands related to all partitions supported by the data storage device. The method 500 may also include writing the master table to a non-volatile memory (NVM) array of the data storage device as shown at block 516.

Figure 6:
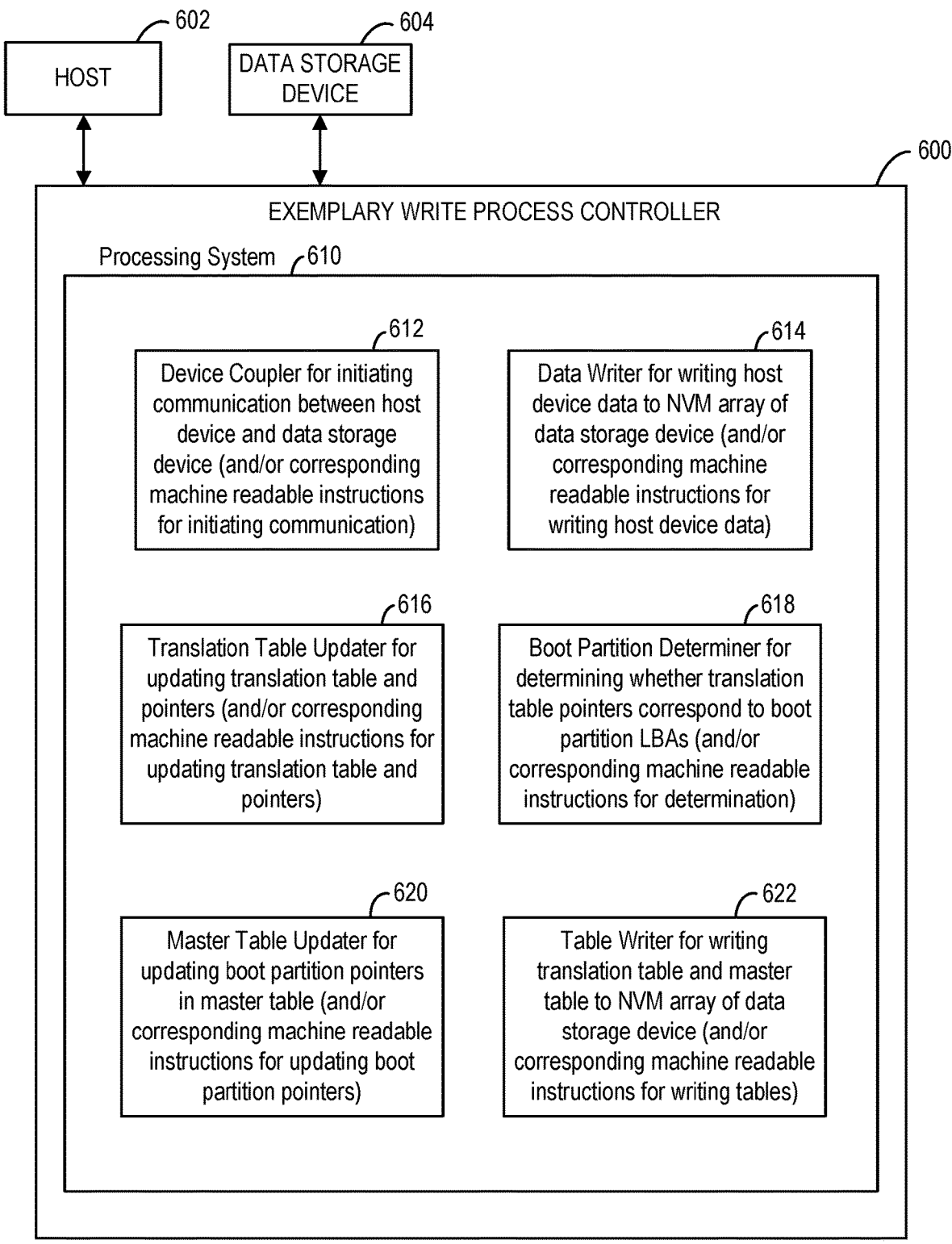
FIG. 6 is a block diagram summarizing selected features of a write process controller equipped for managing a write process in accordance with aspects of the disclosure.

FIG. 6 is a block diagram summarizing selected features of a write process controller 600 equipped for managing a write process in accordance with aspects of the disclosure. The write process controller 600 may be configured to communicate with a host device 602 and a data storage device (e.g., SSD) 604. Although many examples described herein relate to NVM controllers or flash controllers for executing operations in conjunction with flash dies, the data storage device 604 may be any suitable memory or storage device and is not limited to NVM devices, and the write process controller 600 may be any suitable memory controller device and is not limited to NVM-based controllers.

The exemplary write process controller 600 of FIG. 6 includes a processor 610 (e.g., processing system/circuitry). The processor 610 includes a device coupler 612 configured to initiate communication between the host device 602 and the data storage device 604. The processor 610 also includes a data writer 614 configured to write host device data from the host device 602 to a non-volatile memory (NVM) array of the data storage device 604. The processor 610 further includes a translation table updater 616 configured to update a translation table to map logical block addresses (LBAs) of the host device data to physical locations of the host device data in the NVM array of the data storage device 604. The translation table updater 616 is also configured to update translation table pointers based on the updated translation table. The processor 610 includes a boot partition determiner 618 configured to determine whether the updated translation table pointers correspond to LBAs associated with a boot partition. The processor 610 also includes a master table updater 620 configured to update boot partition pointers in a master table based on the updated translation table pointers if the updated translation table pointers correspond to the LBAs associated with the boot partition. The processor 610 further includes a table writer 622 configured to write the translation table and the master table to the NVM array of the data storage device 604.

In at least some examples, means may be provided for performing the functions illustrated in FIGS. 2 and 4 and/or other functions illustrated (such as those described with respect to FIG. 1) or described herein. For example, an apparatus (e.g. processing system 610) may be provided for use with a host device (e.g., host 602) and a data storage device (e.g., data storage device 604), where the apparatus includes: means (such as the data coupler 612) for initiating communication between the host device and the data storage device; means (such as the data writer 614) for writing host device data from the host device to a non-volatile memory (NVM) array of the data storage device; means (such as the translation table updater 616) for updating a translation table to map logical block addresses (LBAs) of the host device data to physical locations of the host device data in the NVM array; means (such as the translation table updater 616) for updating translation table pointers based on the updated translation table; means (such as the boot partition determiner 618) for determining whether the updated translation table pointers correspond to LBAs associated with a boot partition; means (such as the master table updater 620) for updating boot partition pointers in a master table based on the updated translation table pointers if the updated translation table pointers correspond to the LBAs associated with the boot partition; and means (such as the table writer 622) for writing the translation table and the master table to the NVM array of the data storage device.

In one aspect, means for performing some of the functions described above may also be found in FIG. 1.

Figure 7:
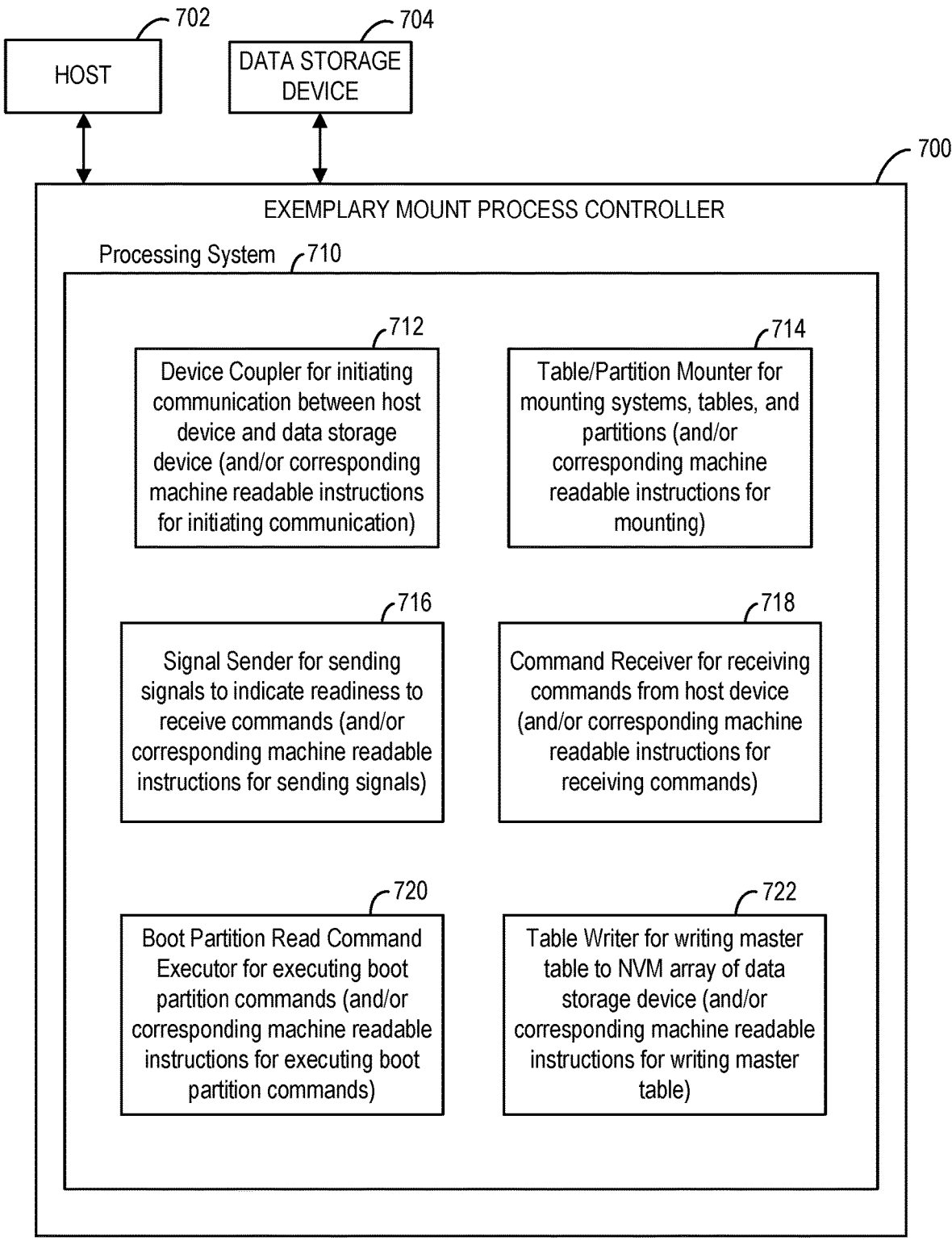
FIG. 7 is a block diagram summarizing selected features of an exemplary mount process controller equipped for managing a mount process at a data storage device in accordance with aspects of the disclosure.

FIG. 7 is a block diagram summarizing selected features of an exemplary mount process controller 700 equipped for managing a mount process at a data storage device (e.g., SSD) in accordance with aspects of the disclosure. The mount process controller 600 may be configured to communicate with a host device 602 and a data storage device (e.g., SSD) 704. Although many examples described herein relate to NVM controllers or flash controllers for executing operations in conjunction with flash dies, the data storage device 704 may be any suitable memory or storage device and is not limited to NVM devices, and the mount process controller 700 may be any suitable memory controller device and is not limited to NVM-based controllers.

The exemplary mount process controller 700 of FIG. 7 includes a processor 710 (e.g., processing system/circuitry). The processor 710 includes a device coupler 712 configured to initiate communication between the host device 702 and the data storage device 704 using a mount process. The processor 710 also includes a table/partition mounter 714 configured to mount at least a read only memory (ROM) system, a master table, a translation table, a boot partition, and a main partition. The processor 710 further includes a signal sender 716 configured to send a signal to the host device 702 after the master table is mounted. The signal indicates that the data storage device 704 is ready to receive, from the host device 702, a boot partition read command related to a boot partition supported by the data storage device 704. The signal sender 716 is also configured to send a second signal to the host device 702. The second signal indicates that the data storage device 704 is ready to receive, from the host device 702, commands related to all partitions supported by the data storage device 704. The processor 710 includes a command receiver 718 configured to suspend the mount process for a window of time to receive the boot partition read command from the host device 702. The command receiver 718 is configured to receive a command during the window of time and determine whether the command is the boot partition read command. The processor 710 also includes a boot partition read command executor 720 configured to execute the boot partition read command if the boot partition read command is received during the window of time. The boot partition read command executor 720 is also configured to refrain from executing a received command if the command is not the boot partition read command. The processor 710 further includes a table writer 722 configured to write the master table to a non-volatile memory (NVM) array of the data storage device 704.

In at least some examples, means may be provided for performing the functions illustrated in FIGS. 3 and 5 and/or other functions illustrated (such as those described with respect to FIG. 1) or described herein. For example, an apparatus (e.g. processing system 710) may be provided for use with a host device (e.g., host 702) and a data storage device (e.g., data storage device 704), where the apparatus includes: means (such as the device coupler 712) for initiating communication with a host device using a mount process; means (such as the table/partition mounter 714) for mounting a read only memory (ROM) system, a master table, a translation table, a boot partition, and a main partition; means (such as the signal sender 716) for sending a signal to the host device after the master table is mounted, the signal indicating that the data storage device is ready to receive, from the host device, a boot partition read command related to a boot partition supported by the data storage device, and for sending a second signal to the host device, the second signal indicating that the data storage device is ready to receive, from the host device, commands related to all partitions supported by the data storage device; means (such as the command receiver 718) for suspending the mount process for a window of time to receive the boot partition read command from the host device; means (such as the boot partition read command executor 720) for executing the boot partition read command if the boot partition read command is received during the window of time, and for refraining from executing a received command if the command is not the boot partition read command; and means (such as the table writer 722) for writing the master table to a non-volatile memory (NVM) array of the data storage device 704.

In one aspect, means for performing some of the functions described above may also be found in FIG. 1.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

What is claimed is:

1. A data storage device for managing a mount process, comprising:
    a non-volatile memory (NVM) array; and
    a processor coupled to the NVM array and configured to:
        initiate communication with a host device using a mount process, mount a master table prior to mounting a logical-to-physical (L2P) translation table during the mount process, the master table including boot partition pointers associated with a host boot partition supported by the data storage device,
        send a signal to the host device after the master table is mounted, the signal indicating that the data storage device is ready to receive, from the host device, a host boot partition read command related to the host boot partition,
        suspend the mount process for a window of time to receive the host boot partition read command from the host device, and
        execute, prior to mounting the L2P translation table or any portion thereof, the host boot partition read command if the host boot partition read command is received during the window of time, wherein the host boot partition read command is executed using the boot partition pointers included in the master table.

2. The data storage device of claim 1, wherein the processor configured to suspend the mount process is configured to:
    receive a command during the window of time; and
    determine whether the command is the host boot partition read command.

3. The data storage device of claim 2, wherein the processor is further configured to refrain from executing the command if the command is not the host boot partition read command.

4. The data storage device of claim 1, wherein if the host boot partition read command is not received during the window of time, the processor is further configured to:
    mount the L2P translation table;
    mount the host boot partition; and
    mount a main partition.

5. The data storage device of claim 4, wherein the processor is further configured to send a second signal to the host device, the second signal indicating that the data storage device is ready to receive, from the host device, commands related to all partitions supported by the data storage device.

6. The data storage device of claim 4, wherein the processor is further configured to write the master table to the NVM array.

7. The data storage device of claim 1, wherein the processor is further configured to mount a read only memory (ROM) system.

8. A method of managing a mount process at a data storage device, comprising:
    initiating communication with a host device using a mount process;
    mounting a master table prior to mounting a logical-to-physical (L2P) translation table during the mount process, the master table including boot partition pointers associated with a host boot partition supported by the data storage device;
    sending a signal to the host device after the master table is mounted, the signal indicating that the data storage device is ready to receive, from the host device, a host boot partition read command related to the host boot partition;

suspending the mount process for a window of time to receive the host boot partition read command from the host device; and executing, prior to mounting the L2P translation table or any portion thereof, the host boot partition read command if the host boot partition read command is received during the window of time.

9. The method of claim 8, wherein the host boot partition read command is executed using the boot partition pointers included in the master table.

10. The method of claim 8, wherein the suspending the mount process comprises:

receiving a command during the window of time; and determining whether the command is the host boot partition read command.

* * * * *